No. 697,674. Patented Apr. 15, 1902.
T. B. SHANAHAN.
AUTOMATIC TROLLEY CATCHER.
(Application filed Aug. 7, 1901.)
(No Model.) 2 Sheets—Sheet 1.
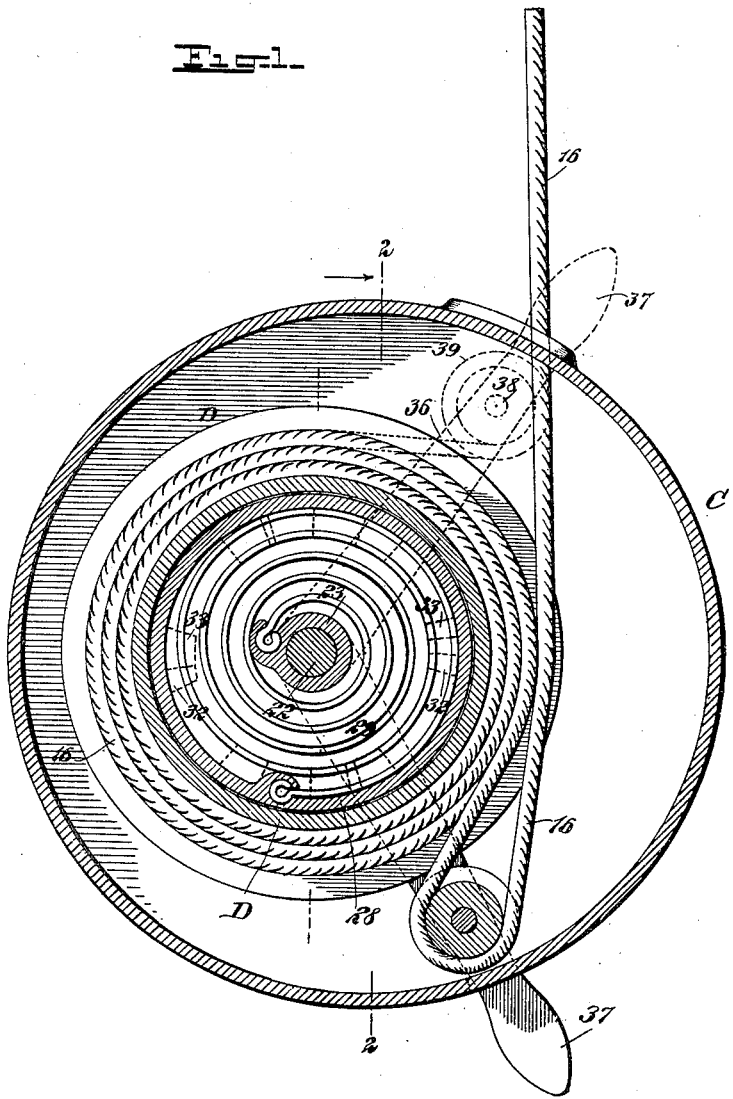
WITNESSES:
INVENTOR
Thomas B. Shanahan.
BY
ATTORNEYS

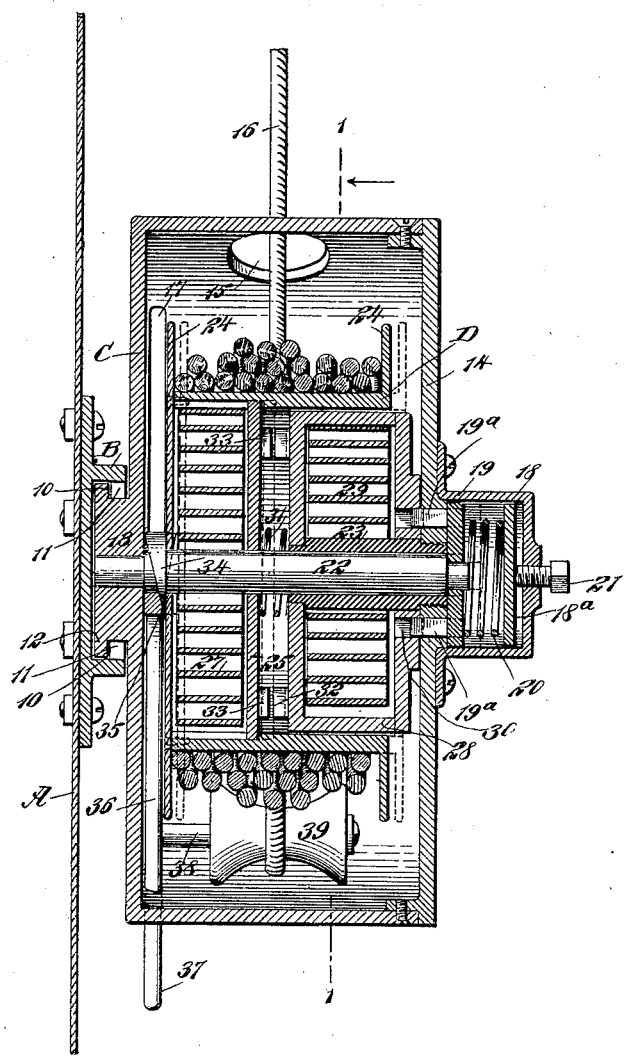

UNITED STATES PATENT OFFICE.

THOMAS B. SHANAHAN, OF GLOVERSVILLE, NEW YORK.

AUTOMATIC TROLLEY-CATCHER.

SPECIFICATION forming part of Letters Patent No. 697,674, dated April 15, 1902.

Application filed August 7, 1901. Serial No. 71,190. (No model.)

*To all whom it may concern:*

Be it known that I, THOMAS B. SHANAHAN, a citizen of the United States, and a resident of Gloversville, in the county of Fulton and State of New York, have invented a new and Improved Automatic Trolley-Catcher, of which the following is a full, clear, and exact description.

The purpose of the invention is to provide a device adapted for attachment to a trolley-car and to the trolley-pole of the car, the device being so constructed that the moment the trolley-wheel jumps the feed or line wire the device will automatically act to draw the pole downward and hold it in such position until sufficient slack is provided in the rope connecting the device with the pole to permit the wheel of the pole to again connect with the feed-wire, and, further, to so construct the device that when the trolley-pole rope is drawn therefrom the springs connected with a drum in the device on which the rope is wound will be turned in a direction to wind the springs.

Another purpose of the invention is to provide the drum of the device with two independent springs of different power, the lesser spring being of just sufficient power to take up the slack on the trolley-pole rope and permit the pole to accommodate itself to high or to low feed-wires, while the stronger spring is arranged to coact with the weaker spring and to act only when the wheel jumps the wire, whereupon the strength of the two springs combined will be greater than the spring of the trolley-pole and draw and hold the latter at a point below the feed-wire.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a section through the device taken practically on the line 1 1 of Fig. 2, and Fig. 2 is a section taken at right angles to that shown in Fig. 1 and substantially on the line 2 2 of Fig. 1.

A represents the dashboard of a trolley-car, provided with a socket B, secured to its outer face. This socket is of circular form and is open at its outer face except for an inner marginal flange 10, having openings 11 therein, as is shown in Fig. 2. These openings receive lugs 12, which are adapted to turn within the socket B, as is shown in Fig. 2, and the lugs form portions of a disk 13, secured to or made integral with the inner closed side of a circular casing C. The opposite or outer side 14 of this casing is removably attached to the peripheral section, as is also shown in Fig. 2, and at the peripheral portion of the casing an opening 15 is made, through which the trolley-pole rope 16 enters the said casing and leaves the same. The casing C is also provided with a slot 17 in its peripheral portion adjacent to its inner head or end.

The removable head or end 14 of the casing is provided with a central opening, and at this opening a circular cap 18 is secured to the outer face of the said removable end or head 14, as is shown in Fig. 2. Within this cap two disks 19 and 18$^a$ are loosely placed. The inner disk 19 is provided with teeth 19$^a$, which normally extend into the casing C through suitable openings in the removable head 14. The outer disk 18$^a$ is in engagement with an adjusting-screw 21, passed through the outer end of the cap 18, and a spring 20 is located within the cap between the opposing faces of the two disks in engagement with said faces. It will be observed that the inner disk 19 is thus rendered spring-controlled and that by means of the adjusting-screw 21 more or less tension may be applied in an inward direction upon said inner disk 19.

A shaft 22 is journaled at one end in the disk 13, which is secured to the closed end or head of the casing C, the other end of the shaft being journaled in the inner spring-controlled disk 19, as is shown in Fig. 2. The ends of the shaft are in the nature of trunnions and are of less diameter than the central portion of the shaft, so that shoulders are formed on said shaft near its ends, one shoulder having bearing against the closed inner head of the casing C, while the other shoulder engages with the inner face of the inner spring-connected disk 19. A further bearing 23 is provided for the shaft 22, and this bearing 23 is in the form of a sleeve having reduced ends, one of which ends is screwed into the removable head 14 of the casing at the central opening therein. A drum D is mounted to turn loosely on the shaft 22, and this drum is provided with peripheral flanges 24 at its sides, and the inner head of the drum is closed in any suitable or approved manner. A partition 25 is secured within the drum, which is hollow at a point between its center and the inner head of the drum, in which chamber a coiled spring 27 is located, having one end secured to the shaft 22 and the other end attached to the inner peripheral face of the drum. It will thus be observed that the outer side portion of the drum D is open, and in this portion of the drum a barrel 28 is mounted to turn on the sleeve-bearing 23, as shown in Fig. 2. A spring 29 is coiled within this barrel, being attached at one end to the sleeve-bearing 23 and at its opposite end to the inner peripheral surface of the barrel, as is illustrated in Fig. 1.

At the outer face of the barrel 28 a circular groove, opening, or channel 30 is made, adapted to receive the lugs 19ª from the inner spring-controlled disk 19 when said disk is in its normal position, and when such engagement takes place between the lugs 19ª and the barrel 28 the barrel is prevented from turning.

A spring 31 is coiled around the shaft 22, having bearing at one end against the partition 25 and at the opposite end against the inner side of the barrel 28. This spring 31 serves to force the barrel 28 normally outward, so that its channel or groove 30 will receive the aforesaid lugs 19ª of the disk 19.

Lugs or offsets 32 are formed upon the inner side face of the barrel 28 near the periphery of the said barrel, and corresponding lugs or offsets 33 are located upon the outer face of the partition 25. When the drum D is forced in an outward direction, the lugs or offsets 33 will be brought in the path of the lugs or offsets 32 on the barrel and the spring-controlled disk 19 will be forced outward, relieving the barrel 28 from engagement with the lugs 19ª, thus permitting the spring in the barrel to act in conjunction with the spring in the chamber of the drum, both springs serving at such time to rotate the barrel and to wind up the trolley-rope 16 thereon.

The spring 27 in the chamber 26 of the drum is of less power than the spring in the barrel; but the spring in the chamber of the drum is just sufficient to take up any slack that may occur in the trolley-pole rope 16 and is weaker than the spring on the trolley-pole. Thus the trolley-pole is enabled to accommodate itself to feed-wires high or low. However, when the strength of the spring in the barrel is added to that of the spring in the chamber of the drum the combined strength of the two springs overcomes the strength of the spring on the trolley-pole, so that should the trolley-wheel leave the feed-wire the drum is revolved in a manner to wind up the rope 16 thereon and bring the trolley-pole down to a point below the feed-wire.

The adjustment of the drum D is accomplished by securing a spirally-formed cam 34 on the shaft 22 near its inner end, yet within the casing C, as is shown in Fig. 2. The head of a lever 36, located within the barrel, is loosely passed around the said cam 34, and this head has an inclined surface 35, adapted for engagement with the inclined plane of the cam 34. The handle end 37 of this lever 36 passes out from the casing through the slot 17 therein, and when the lever is in the lower position (shown in positive lines in the drawings) the drum D will be in its normal position and the spring-controlled disk 19 will be in locking engagement with the barrel 28, and the lesser spring 27 in the drum will be the only spring in action. This lever within the casing is provided with a spindle 38, which extends across the periphery of the drum D, and after the trolley-pole rope 16 has been wound upon the drum and before the said rope is carried out through the opening 15 in the casing the rope is passed over a friction-pulley 39, carried by the said spindle 38, so that the rope 16 will be normally kept under proper tension. When the lever 36 is carried to the upper position, (shown in Fig. 1,) the thicker portions of the cam and inclined portion of the head of the lever will be brought together and the shaft 22 will be shifted endwise in an outward direction, thus forcing the spring-controlled disk 19 within the cap 18, carrying the lugs 19ª of said disk from locking engagement with the barrel, permitting the spring in the barrel to act, and during such end movement of the shaft 22 the lugs 33, carried by the drum, will be brought in the path of the lugs 32, carried by the barrel, and consequently both of the springs will act together on the drum to turn the same. The shaft 22 is thus shifted at the moment that the trolley-wheel leaves the feed-wire, as at such time the spring on the trolley-pole overcomes the power of the spring 27 of the drum and the lever 36 is carried upward; but the moment the lever reaches its uppermost position the barrel 28 acts as stated and the drum is revolved in a manner to draw the trolley-pole downward.

When the trolley-wheel is to be restored to an engagement with the feed-wire while the lever 36 is in its upper position, the trolley-pole rope 16 is drawn from the drum to a sufficient extent to enable the trolley-wheel to make contact with the feed-wire and to provide for some slack, and as the trolley-rope 16 is thus drawn outward the drum D is turned in a direction to wind up both of the springs 27 and 29, and at such time the lever 36 is again carried down to its lower position, and the shaft 22 is consequently restored to its normal position by the action of the spring 20, which spring at the same time forces the inner disk 19 inward, carrying its lugs 19ª to a locking engagement with the barrel, preventing the spring in the said barrel from acting.

Having thus described my invention, I claim as new and desire to secure by Letters Patent—

1. An automatic trolley-catcher, consisting of a fixed casing or shell, a spring-controlled drum mounted to turn in the said shell or casing, the drum being adapted to carry one end portion of a trolley-pole rope, a spring-controlled barrel independently mounted within the said drum, means for laterally shifting the said drum, offsets from the drum and barrel, which offsets are brought in the path of each other when the drum is shifted in one direction, and locking devices for the spring-controlled barrel, controlled by the shifting movement of the drum, for the purpose described.

2. An automatic trolley-catcher, consisting of a fixed casing or shell, a shaft, a drum mounted loosely on the said shaft and adapted to carry a portion of the trolley-pole rope, a spring secured to the shaft and to the drum, which spring is of sufficient strength to take up the slack of the trolley-pole rope, a barrel mounted on the said shaft within the drum, a spring within the said barrel, acting in the same direction as the spring in the drum, but of greater strength, extensions from the barrel and the spring-containing portion of the drum, which extensions are adapted to be brought one in the path of the other when the drum is shifted sidewise, a spring-controlled bearing for one end of the shaft, having lugs which normally enter an opening in a side of the barrel, a cam carried by the shaft, having bearing against the drum, and a lever provided with a head having an inclined surface, which inclined surface is in engagement with the said cam, whereby through the movement of the lever the shaft upon which the barrel and drum are mounted is given end movement, as set forth.

3. An automatic trolley-catcher, consisting of a fixed casing or shell, a shaft, a drum mounted loosely on the said shaft and adapted to carry a portion of the trolley-pole rope, a spring secured to the shaft and to the drum, which spring is of sufficient strength to take up the slack of the trolley-pole rope, a barrel mounted on the said shaft within the drum, a spring within the said barrel, acting in the same direction as the spring in the drum but of greater strength, extensions from the barrel and the spring-containing portion of the drum, which extensions are adapted to be brought one in the path of the other when the drum is shifted sidewise, a spring-controlled bearing for one end of the shaft, having lugs which normally enter an opening in a side of the barrel, a cam carried by the shaft, having bearing against the drum, a lever provided with a head having an inclined surface, which inclined surface is in engagement with the said cam, whereby through the movement of the lever the shaft upon which the drum and barrel are mounted is given end movement, a spindle extending from the lever within the said shell or casing, the free end of the lever extending out through a slot in the said shell or casing, a friction-pulley carried by the said spindle and located over the peripheral portion of the drum, over which pulley the trolley-pole rope carried by the drum is adapted to pass, and a spring coiled around the said shaft, having bearing against the said barrel and against a partition in the drum, the spring serving normally to hold the barrel in position to be locked and its extensions out of the path of the extensions carried by the spring-section of the drum.

In testimony whereof I have signed my name to this specification in the presence of two subscribing witnesses.

THOMAS B. SHANAHAN.

Witnesses:
FRANK BURTON,
DAVID H. DEMAREST.